United States Patent
Hayama et al.

(10) Patent No.: US 9,871,944 B2
(45) Date of Patent: Jan. 16, 2018

(54) IMAGE FORMING APPARATUS, DATA TRANSMISSION METHOD, AND DATA TRANSMISSION SYSTEM

(71) Applicant: KYOCERA Document Solutions Inc., Osaka (JP)

(72) Inventors: Masayoshi Hayama, Osaka (JP); Masaru Sato, Osaka (JP); Kazunori Goto, Osaka (JP); Masaki Kikuchi, Osaka (JP); Toshiya Miyai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 147 days.

(21) Appl. No.: 14/947,559

(22) Filed: Nov. 20, 2015

(65) Prior Publication Data

US 2016/0150122 A1   May 26, 2016

(30) Foreign Application Priority Data

Nov. 25, 2014   (JP) ................. 2014-237680

(51) Int. Cl.
*H04N 1/44* (2006.01)
*H04N 1/32* (2006.01)
(Continued)

(52) U.S. Cl.
CPC ......... *H04N 1/32272* (2013.01); *G06F 21/62* (2013.01); *H04N 1/0084* (2013.01);
(Continued)

(58) Field of Classification Search
None
See application file for complete search history.

(56) References Cited

U.S. PATENT DOCUMENTS 8,135,135 B2 * 3/2012 Biddle ................ G06F 11/1415
380/286
2008/0253573 A1 * 10/2008 Sakurai .............. H04N 1/32609
380/278
(Continued)

FOREIGN PATENT DOCUMENTS

JP      2007104430 A  *  4/2007
JP      2008244892 A  *  10/2008
(Continued)

*Primary Examiner* — Kambiz Zand
*Assistant Examiner* — Arezoo Sherkat
(74) *Attorney, Agent, or Firm* — Studebaker & Brackett PC

(57) ABSTRACT

An image forming apparatus transmits a database to an external server. The image forming apparatus includes a storage section, a replication section, an encipherment section, a transmission section, a generation section, and an acquisition section. The storage section stores a database therein. The replication section generates a replica of the database stored in the storage section as a replicated database. The encipherment section enciphers the replicated database. The transmission section transmits the enciphered database to the external server each time a predetermined time period elapses. The generation section generates a deciphering key for deciphering the enciphered database. The acquisition section acquires disaster information. Upon the acquisition section acquiring the disaster information, the transmission section transmits the deciphering key to the external server.

5 Claims, 4 Drawing Sheets

(51) Int. Cl.
*H04N 1/00* (2006.01)
*H04N 1/21* (2006.01)
*G06F 21/62* (2013.01)

(52) U.S. Cl.
CPC ....... *H04N 1/00244* (2013.01); *H04N 1/2166* (2013.01); *H04N 1/4486* (2013.01); *H04N 2201/0082* (2013.01)

(56) References Cited

U.S. PATENT DOCUMENTS

2011/0286026 A1* 11/2011 Matsuzawa ........... G06F 3/1222
358/1.14
2012/0284511 A1* 11/2012 Paddon .................. H04W 4/02
713/168
2012/0285378 A1* 11/2012 Sato .................... B41F 15/0881
118/668

FOREIGN PATENT DOCUMENTS

JP          2009-171199        7/2009
JP          2009171199 A   *   7/2009

* cited by examiner

IMAGE FORMING APPARATUS, DATA TRANSMISSION METHOD, AND DATA TRANSMISSION SYSTEM

INCORPORATION BY REFERENCE

The present application claims priority under 35 U.S.C. §119 to Japanese Patent Application No. 2014-237680, filed on Nov. 25, 2014. The contents of this application are incorporated herein by reference in their entirety.

BACKGROUND

The present disclosure relates to image forming apparatuses, data transmission methods, and data transmission systems.

When a certain image forming apparatus receives an earthquake early warning, the image forming apparatus transmits data stored in the image forming apparatus to an external device installed in a safe site in order to save the data. Security measures against loss of the data stored in the image forming apparatus are implemented through completion of transmission of the data prior to occurrence of main tremors of an earthquake.

SUMMARY

An image forming apparatus according to a first aspect of the present disclosure transmits data to an external device. The image forming apparatus includes a storage section, a replication section, an encipherment section, a transmission section, a generation section, and an acquisition section. The storage section stores data therein. The replication section generates a replica of the data stored in the storage section as replicated data. The encipherment section enciphers the replicated data. The transmission section transmits the enciphered data to the external device each time a predetermined time period elapses. The generation section generates a deciphering key for deciphering the enciphered data. The acquisition section acquires disaster information. The transmission section transmits the deciphering key to the external device upon the acquisition section acquiring the disaster information.

A data transmission method according to a second aspect of the present disclosure is a data transmission method implemented by an image forming apparatus that transmits data to an external device. The image forming apparatus includes a storage section that stores the data therein. The data transmission method includes: generating a replica of the data stored in the storage section as replicated data; enciphering the replicated data; transmitting the enciphered data to the external device each time a predetermined time period elapses; generating a deciphering key for deciphering the enciphered data; acquiring disaster information; and transmitting the enciphering key to the external device upon acquisition of the disaster information in the acquiring.

A data transmission system according to a third aspect of the present disclosure includes an image forming apparatus that transmits data stored therein and an external device that receives the transmitted data. The image forming apparatus includes a storage section, a replication section, an encipherment section, a transmission section, a generation section, and an acquisition section. The storage section stores data therein. The replication section generates a replica of the data stored in the storage section as replicated data. The encipherment section enciphers the replicated data. The transmission section transmits the enciphered data to the external device each time a predetermined time period elapses. The generation section generates a deciphering key for deciphering the enciphered data. The acquisition section acquires disaster information. The transmission section transmits the deciphering key to the external device upon the acquisition section acquiring the disaster information. The external device includes a data receiver and a decipherment section. The data receiver receives the data enciphered in the image forming apparatus and the deciphering key generated in the image forming apparatus. The decipherment section deciphers the enciphered data using the deciphering key.

DETAILED DESCRIPTION

An embodiment of the present disclosure will be described below with reference to the accompanying drawings. Note that the below-described embodiment does not limit the disclosure of the appended claims. Also note that not all of the elements described in the following embodiment are essential to achievement of the advantages of the present disclosure. Like reference signs denote like elements through the drawings.

Figure 1:
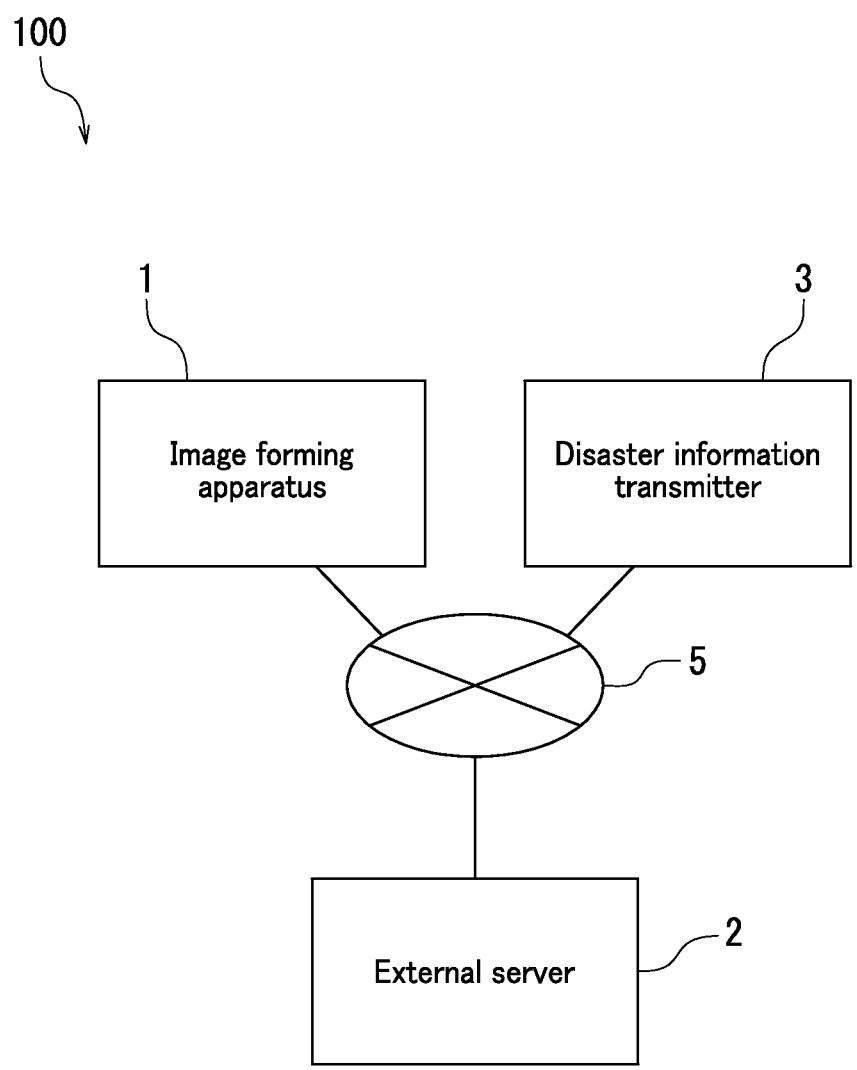
FIG. 1 illustrates a configuration of a data transmission system according to an embodiment of the present disclosure.

With reference to FIG. 1, a description will be given of a data transmission system 100 according to the present disclosure. FIG. 1 illustrates a configuration of the data transmission system 100. The data transmission system 100 transmits data stored in an image forming apparatus 1 to an external device installed in a remote site. The data transmission system 100 includes the image forming apparatus 1 and an external server 2 as an external device. The image forming apparatus 1 is connected to the external server 2 in a communicable manner via a communication network 5. The communication network 5 may be Internet or a wide area network (WAN), for example. Encipherment using a secure sockets layer (SSL) protocol may be adopted in communication via the communication network 5.

The image forming apparatus 1 stores therein a database constituted by data such as text information, image information, etc. The image forming apparatus 1 has a replication function. The replication function is a function of generating a replica of a database stored in a given device, causing another device to store the replica of the database, and maintaining synchronization between the database stored in the given device and the replica of the database stored in the other device. The image forming apparatus 1 in the present embodiment causes the external server 2 to store a replica of the database stored in the image forming apparatus 1 and maintains synchronization between the database stored in the image forming apparatus 1 and the database stored in the external server 2.

Specifically, each time a predetermined time period elapses, the image forming apparatus 1 transmits a replica of the database stored in the image forming apparatus 1 to the external server 2. The external server 2 stores the transmitted database. That is, the database stored in the external server 2 is updated according to update of the database stored in the image forming apparatus 1. A user can optionally set timing of transmission of the database stored in the image forming apparatus 1 to the external server 2. The image forming apparatus 1 may transmit a replica of the database to the external server 2 at intervals of 10 seconds or 5 minutes, for example.

The image forming apparatus 1 in the present embodiment enciphers a replica of the database and then transmits the enciphered replica to the external server 2. The enciphered database is deciphered using a deciphering key that the image forming apparatus 1 generates. The data amount of the deciphering key is smaller than that of the database stored in the image forming apparatus 1.

A disaster information transmitter 3 is an information source of disaster information and transmits the disaster information. The disaster information transmitter 3 may be a disaster information transmitter installed in, for example, an administrative agency, such as the Meteorological Agency, a fire station, or a police station. Alternatively, the disaster information transmitter 3 may be a disaster prevention information transmitter of a certain municipality. The disaster information may be information of an extraordinary event including, for example, earthquake information, an earthquake early warning, flood information, fire information, and lightning information.

The image forming apparatus 1 acquires disaster information from the disaster information transmitter 3. Upon acquiring the disaster information, the image forming apparatus 1 transmits a deciphering key to the external server 2. The external server 2 uses the transmitted deciphering key to decipher the database that has been enciphered and transmitted by the image forming apparatus 1. That is, the image forming apparatus 1 periodically causes the external server 2 to save the database stored in the image forming apparatus 1 and enables the user to restore saved data in the external server 2 upon occurrence of a disaster.

The image forming apparatus 1 according to the present embodiment maintains synchronization between the database stored in the image forming apparatus 1 and the database stored in the external server 2. The image forming apparatus 1 transmits a deciphering key to the external server 2 upon acquiring disaster information. The data amount of the deciphering key is smaller than that of the database stored in the image forming apparatus 1. A time period necessary to transmit the deciphering key is accordingly shorter than that necessary to transmit the database stored in the image forming apparatus 1. In other words, the image forming apparatus 1 can transmit the deciphering key to the external server 2 within a short period of time after acquisition of disaster information. As a result, the database stored in the image forming apparatus 1 can be protected within a short period of time after acquisition of the disaster information. This can prevent loss of the database when a disaster occurs. Consequently, data constituting the database stored in the image forming apparatus 1 can be prevented from being lost when the disaster occurs.

Further, the external server 2 in the present embodiment is installed at a remote site from the image forming apparatus 1. In the configuration as above, even upon the image forming apparatus 1 being affected by a disaster or the like, the external server 2 may be unlikely to be affected by the disaster. Accordingly, even if the image forming apparatus 1 is physically broken due to the disaster, data constituting the database stored in the image forming apparatus 1 can be restored in the external server 2.

Moreover, in the present embodiment, the database stored in the image forming apparatus 1 is enciphered and transmitted to the external server 2 installed at the remote site. Therefore, operation of the external server 2 installed at a remote site cannot generally cause decipherment unless a deciphering key is used to initiate the decipherment. Thus, confidentiality of the database stored in the image forming apparatus 1 can be secured in the remote site.

The image forming apparatus 1 in the present embodiment automatically transmits a deciphering key to the external server 2 upon acquiring disaster information. In the above configuration, even if a user is absent from a site where the image forming apparatus 1 is installed when a disaster occurs, the database stored in the image forming apparatus 1 at the time at which the disaster occurs is saved in the external server 2.

Figure 2:
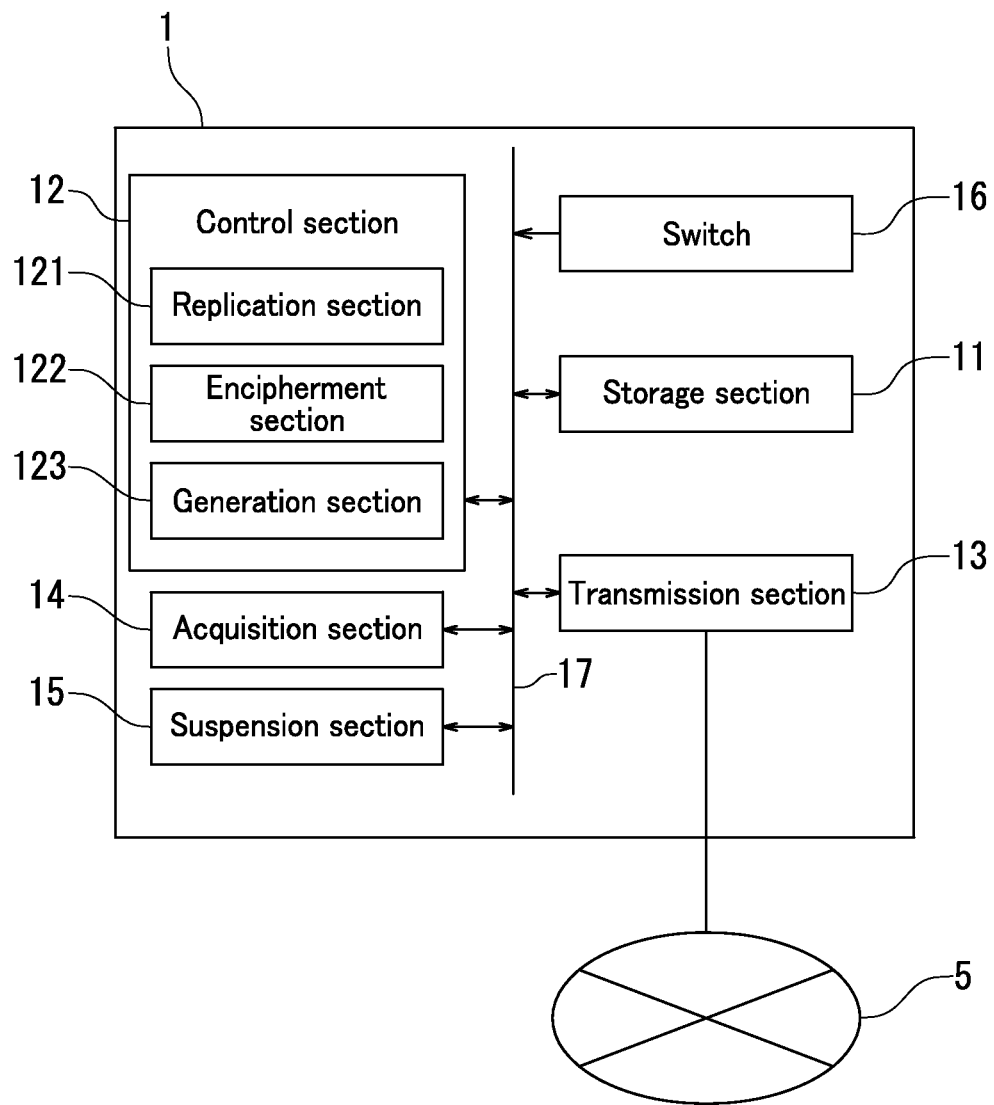
FIG. 2 illustrates a configuration of an image forming apparatus according to the embodiment of the present disclosure.

The image forming apparatus 1 will be described with reference to FIGS. 1 and 2. FIG. 2 is a diagram illustrating a configuration of the image forming apparatus 1. The image forming apparatus 1 may be a copier, printer, facsimile machine, or multifunction peripheral, for example. The multifunction peripheral has at least two functions of a copier, printer, and facsimile machine, for example.

The image forming apparatus 1 includes a storage section 11, a control section 12, a transmission section 13, an acquisition section 14, a suspension section 15, and a switch 16. The storage section 11, the control section 12, the transmission section 13, the acquisition section 14, the suspension section 15, and the switch 16 are connected together via an internal bus 17.

The storage section 11 stores a database therein. The storage section 11 includes a main storage device (e.g., a semiconductor memory) including a read only memory (ROM), a random access memory (RAM), etc. and an auxiliary storage device (e.g., a hard disk drive). The ROM stores therein various types of computer programs that the control section 12 executes.

The control section 12 controls elements of the image forming apparatus 1. The control section 12 may be a central processing unit (CPU), for example. The control section 12 includes a replication section 121, an encipherment section 122, and a generation section 123. The control section 12 executes computer programs stored in the storage section 11 to control the transmission section 13, the acquisition section 14, the suspension section 15, and the switch 16.

The replication section 121 generates a replica of the database stored in the storage section 11 as a replicated database. The encipherment section 122 enciphers the replicated database. The enciphering scheme may be public-key cryptography or symmetric-key cryptography, for example. The symmetric-key cryptography may be Data Encryption Standard (DES) having a block length of 64 bits, for example. The generation section 123 generates a deciphering key for deciphering the enciphered database.

Functions of the control section 12 are implemented through execution by the control section 12 of various computer programs loaded on the RAM from the ROM. Note that implementation of the functions of the replication section 121, the encipherment section 122, and the generation section 123 may be achieved by hardware provided in the image forming apparatus 1, rather than implementation of the respective functions through software.

The transmission section 13 transmits the database stored in the image forming apparatus 1 to the external server 2. Specifically, each time the predetermined time period elapses, the transmission section 13 transmits the database enciphered by the encipherment section 122 to the external server 2. Accordingly, the database stored in the external server 2 is synchronized with the database stored in the image forming apparatus 1. As the predetermined time period, that is, each interval between which the replication function is executed is short, accuracy of the replication function increases.

The acquisition section 14 acquires disaster information from the disaster information transmitter 3. The transmission section 13 transmits a deciphering key to the external server 2 upon the acquisition section 14 acquiring the disaster information.

The suspension section 15 suspends operation of the image forming apparatus 1 upon the transmission section 13 transmitting a deciphering key to the external server 2. In a configuration in which the image forming apparatus 1 has a faxing function, the suspension section 15 suspends a function of receiving facsimile data. In a configuration in which the image forming apparatus 1 has a printing function for forming (printing) an image on a sheet, the suspension section 15 further suspends the function of forming an image on a sheet. The suspension section 15 may suspend the operation of the image forming apparatus 1 by suspending only the respective functions of the image forming apparatus 1 or by turning off the image forming apparatus 1.

The switch 16 is mounted on the image forming apparatus 1. The transmission section 13 transmits a deciphering key to the external server 2 in response to the switch 16 being pressed. By pressing the switch 16, a user can manually cause execution of the replication function of the image forming apparatus 1 through transmission the database stored in the image forming apparatus 1 to the external server 2. In a configuration in which the image forming apparatus 1 includes a touch panel, the switch 16 may be provided in the touch panel. Alternatively, the switch 16 may be provided on the image forming apparatus 1 as a hardware button.

The image forming apparatus 1 according to the present embodiment maintains synchronization between the database stored in the image forming apparatus 1 and the database stored in the external server 2. Thus, a user can restore in the external server 2, the database stored in the image forming apparatus 1 as an approximately up-to-date version of the database stored therein. Accordingly, a situation in which the database is lost in accompaniment with breakage of the image forming apparatus 1 during a disaster can be prevented.

Further, in the present embodiment, the suspension section 15 included in the image forming apparatus 1 suspends update of the stored database upon the acquisition section 14 acquiring disaster information. That is, upon the acquisition section 14 acquiring disaster information, the image forming apparatus 1 inhibits either or both deletion of data constituting the database and storage of new data that is to constitute the database. Specifically, in a configuration in which the image forming apparatus 1 has a faxing function, the image forming apparatus 1 suspends a function of receiving facsimile data upon the acquisition section 14 acquiring disaster information. The image forming apparatus 1 accordingly does not receive facsimile data transmitted after acquisition of the disaster information. As a result, a situation in which facsimile data transmitted after occurrence of the disaster is lost can be prevented.

The image forming apparatus 1 further suspends a function of forming an image on a sheet upon the acquisition section 14 acquiring disaster information. In the above configuration, a situation in which a user leaves a sheet on which an image is formed in the image forming apparatus 1 upon fleeing from a disaster can be prevented. Thus, a situation in which a sheet on which an image of important information is formed is left in the image forming apparatus 1 when a disaster occurs can be prevented.

Figure 3:
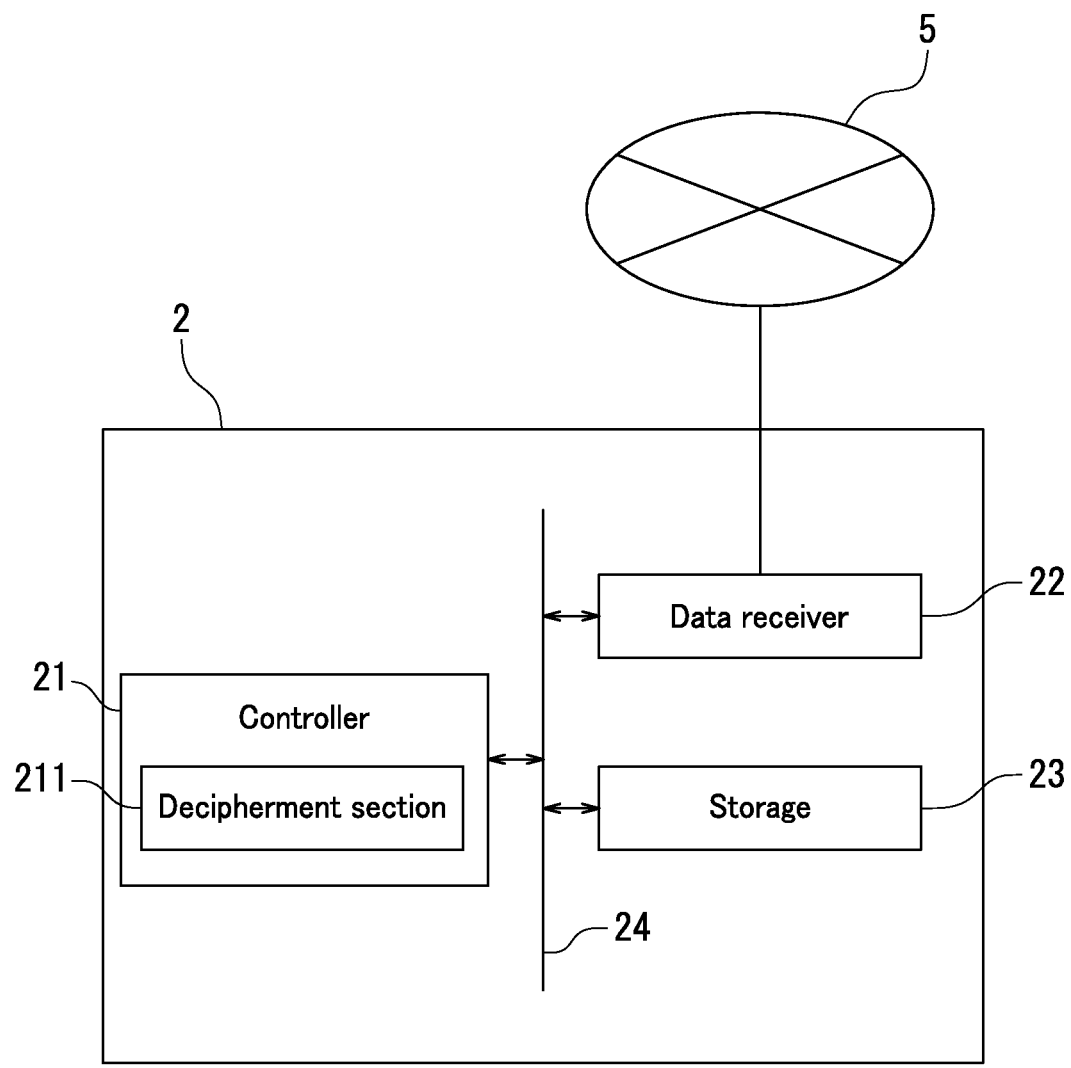
FIG. 3 illustrates a configuration of an external server according to the embodiment of the present disclosure.

The external server 2 will be described next with reference to FIGS. 1-3. FIG. 3 is a diagram illustrating a configuration of the external server 2. The external server 2 includes a controller 21, a data receiver 22, and storage 23. The data receiver 22 receives a database and a deciphering key transmitted from the image forming apparatus 1. The controller 21, the data receiver 22, and the storage 23 are connected together via an internal bus 24.

The storage 23 includes a main storage device including a ROM, a RAM, etc. and an auxiliary storage device. The ROM stores therein various types of computer programs that the controller 21 executes. Functions of the controller 21 are implemented through execution by the controller 21 of various computer programs loaded on the RAM from the ROM. The storage 23 stores therein a database that the data receiver 22 receives.

The controller 21 controls respective elements of the external server 2. The controller 21 includes a decipherment section 211. Specifically, the controller 21 executes computer programs stored in the storage 23 to control the data receiver 22. The controller 21 may be a CPU, for example.

The decipherment section 211 uses a deciphering key to decipher an enciphered database transmitted from the image forming apparatus 1. The decipherment section 211 initiates decipherment of the database stored in the storage 23 upon receipt of the deciphering key. Alternatively, the decipherment section 211 may initiate decipherment of the database stored in the storage 23 in response to execution of a predetermined operation for initiating decipherment, such as pressing of a decipherment start button, after the external server 2 receives a deciphering key. Note that implementation of the function of the decipherment section 211 may be achieved by providing hardware in the external server 2 rather than the software that implements the function.

In the present embodiment, the transmission section 13 transmits a deciphering key to the external server 2 upon the acquisition section 14 acquiring disaster information and a user uses the deciphering key to decipher the database transmitted to the external server 2. In the above configuration, even if the image forming apparatus 1 is broken due to a disaster, the database stored in the image forming apparatus 1 can be deciphered in the external server 2 by a user. Thus, adverse effects that a user experiences due to loss of the database stored in the image forming apparatus 1 can be reduced.

Further, the external server 2 in the present embodiment is installed at a remote site from the image forming apparatus 1. In the above configuration, breakage of the external server 2 can be prevented even when the image forming apparatus 1 is broken in a disaster. Thus, loss of a database caused due to breakage of the image forming apparatus 1 in a disaster can be prevented, thereby reducing adverse effects caused by loss of the database.

Figure 4:
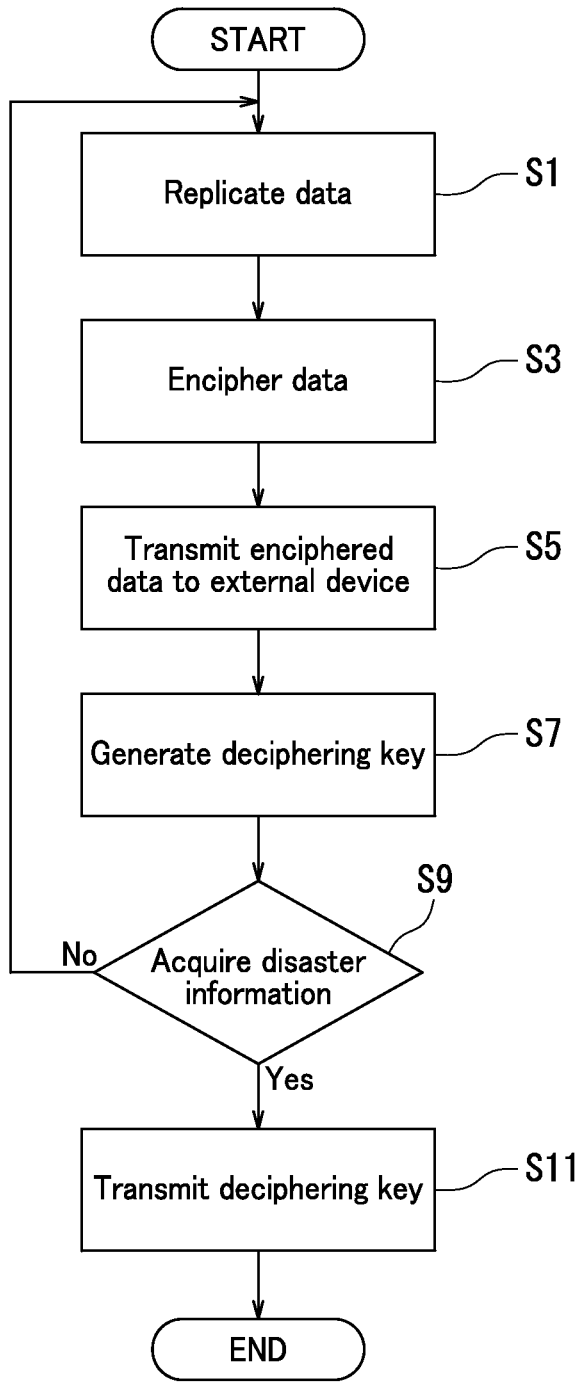
FIG. 4 is a flowchart depicting a data transmission method according to the embodiment of the present disclosure.

Processing executed in the data transmission system 100 will be described next in detail with reference to FIGS. 1-4. FIG. 4 is a flowchart depicting a data transmission method.

At Step S1, the replication section 121 of the image forming apparatus 1 generates a replica of a database stored in the storage section 11 of the image forming apparatus 1 as a replicated database. At Step S3, the encipherment section 122 of the image forming apparatus 1 enciphers the database replicated at Step S1. At Step S5, the transmission section 13 of the image forming apparatus 1 transmits the database enciphered at Step S3 to the external server 2. Through execution of Steps S1-S5, the data transmission method implements the replication function of the image forming apparatus 1.

At Step S7, the generation section 123 of the image forming apparatus 1 generates a deciphering key. The deciphering key can be used in the external server 2 for deciphering the database enciphered at Step S3. At Step S9, the acquisition section 14 of the image forming apparatus 1 acquires disaster information from the disaster information transmitter 3. Until the acquisition section 14 acquires disaster information at Step S9, that is, when a negative determination (No) is made at Step S9, the routine returns to Step S1. That is, Steps S1-S9 are repeated until the acquisition section 14 acquires disaster information. The image forming apparatus 1 accordingly continues executing the replication function. In this manner, the state in which the database in the external server 2 is synchronized with the database in the image forming apparatus 1 can be maintained.

Upon the acquisition section 14 of the image forming apparatus 1 acquiring disaster information at Step S9, that is, upon a positive determination (Yes) being made at Step S9, the routine proceeds to Step S11. At Step S11, the transmission section 13 of the image forming apparatus 1 transmits the deciphering key generated at Step S7 to the external server 2.

As has been described with reference to FIGS. 1-4, the image forming apparatus 1 according to the present embodiment periodically enciphers and transmits a database stored therein to the external server 2. Upon acquiring disaster information, the image forming apparatus 1 transmits a deciphering key to the external server 2. In the above configuration, the database stored in the image forming apparatus 1 can be deciphered in the external server 3 by a user. Thus, loss of the database stored in the image forming apparatus 1 can be reduced even in a situation in which the image forming apparatus 1 is broken due to a disaster or the like.

The embodiment of the present disclosure has been described so far with reference to FIGS. 1-4. Note that the present disclosure is not limited to the above embodiment and a wide range of alterations can be made to the embodiment so long as such alterations do not deviate from the intended scope of the present disclosure, as described in (1) to (3) below, for example. The drawings are schematic illustrations that emphasize elements of configuration in order to facilitate understanding thereof. Therefore, properties of each of the elements, such as thickness, length, and number thereof, may differ from actual properties of the element. The properties of each of the elements described above, such as shape and dimension, are mere examples and not limited specifically. A wide range of variations of the properties can be made to the embodiment so long as such variations do not deviate from the intended scope of the present disclosure.

(1) As described with reference to FIG. 1, the external server 2 is installed at a remote site from the image forming apparatus 1. It is only required that the external server 2 is remote enough from the image forming apparatus 1 not to be affected by a disaster that may occur at a location where the image forming apparatus 1 is installed.

(2) As described with reference to FIG. 1, the image forming apparatus 1 transmits an enciphered data to the single external server 2. However, in a configuration in which the data transmission system 100 includes a plurality of external servers 2, the image forming apparatus 1 may transmit the data to each of the external servers 2. In the above configuration, the database stored in the image forming apparatus 1 can be restored in the data transmission system 100 so long as at least one of the external servers 2 is unaffected by a disaster.

(3) As described with reference to FIG. 2, the generation section 123 generates a deciphering key. The deciphering key may be a fixed value. Alternatively, the deciphering key may be generated using a different value, that is, a different identifier each time the predetermined time period elapses. A deciphering key may be generated with timing different from timing when the image forming apparatus 1 transmits a database to the external server 2. For example, the deciphering key may be updated at intervals of 1 hour or 24 hours.

What is claimed is:

1. An image forming apparatus that transmits data base to an external device, comprising:
    a storage section that stores the data base and computer programs therein;
    a controller including a processor;
    a transmitter;
    a receiver that receives disaster information from a disaster information transmitter; and
    a switch, wherein
    the processor executes the computer programs to function as a replication section, an encipherment section, a generation section, and a suspension section,
    the replication section generates a replica of the data base stored in the storage section as a replicated data base,
    the encipherment section enciphers the replicated data base,
    the transmitter transmits the enciphered data base to the external device each time a predetermined time period elapses,
    the generation section generates a deciphering key for deciphering the enciphered data base,
    the transmitter transmits the deciphering key to the external device upon the receiver receiving the disaster information,
    the disaster information includes earthquake information, an earthquake early warning, flood information, fire information, or lightning information,
    the data base is constituted by data including text information or image information,
    the transmitter transmits the deciphering key to the external device in response to the switch being pressed,
    the suspension section suspends an operation of the image forming apparatus upon transmission of the deciphering key to the external device,
    the external device is installed at a remote site from the image forming apparatus, thereby reducing the likelihood that the external device is affected by a disaster in the event that the disaster occurs in a site where the image forming apparatus is installed, and
    the data base is configured to be restored from the external device after occurrence of the disaster.

2. The image forming apparatus according to claim 1, wherein
    upon the receiver receiving the disaster information, the storage section is inhibited from either or both deleting the data base stored in the storage section and storing a new data base.

3. The image forming apparatus according to claim 1, wherein the generation section generates the deciphering key using a different identifier each time the predetermined time period elapses.

4. A data transmission method implemented by an image forming apparatus that transmits data base to an external device, the image forming apparatus including a storage section that stores data therein, the method comprising:
   generating a replica of the data base stored in the storage section as a replicated data base;
   enciphering the replicated data base;
   transmitting the enciphered data base to the external device each time a predetermined time period elapses;
   generating a deciphering key for deciphering the enciphered data base;
   receiving disaster information;
   transmitting the deciphering key to the external device upon receipt of the disaster information; and
   suspending an operation of the image forming apparatus upon transmission of the deciphering key to the external device, wherein
   the disaster information includes earthquake information, an earthquake early warning, flood information, fire information, or lightning information,
   the data base is constituted by data including text information or image information,
   the deciphering key is transmitted to the external device in response to a switch being pressed,
   the external device is installed at a remote site from the image forming apparatus, thereby reducing the likelihood that the external device is affected by a disaster in the event that the disaster occurs in a site where the image forming apparatus is installed, and
   the data base is configured to be restored from the external device after occurrence of the disaster.

5. A data transmission system comprising an image forming apparatus that transmits data base stored therein, an external device that receives the transmitted data base, and a disaster information transmitter that transmits disaster information, wherein
   the image forming apparatus includes:
      a storage section that stores data base and computer programs therein;
      a controller including a processor;
      a transmitter;
      a receiver that receives the disaster information from the disaster information transmitter; and
      a switch,
   the processor executes the computer programs to function as a replication section, an encipherment section, a generation section, and a suspension section,
      the replication section generates a replica of the data base stored in the storage section as a replicated data;
      the encipherment section enciphers the replicated data base;
      the transmitter transmits the enciphered data base to the external device each time a predetermined time period elapses;
      the generation section generates a deciphering key for deciphering the enciphered data base,
   the transmitter transmits the deciphering key to the external device upon the receiver receiving the disaster information,
   the external device includes:
      a data receiver configured to receive the enciphered data base and the deciphering key from the image forming apparatus; and
      a controller configured to decipher the enciphered data base using the deciphering key,
   the disaster information includes earthquake information, an earthquake early warning, flood information, fire information, or lightning information,
   the data base is constituted by data including text information or image information,
   the transmitter transmits the deciphering key to the external device in response to the switch being pressed,
   the suspension section suspends an operation of the image forming apparatus upon transmission of the deciphering key to the external device,
   the external device is installed at a remote site from the image forming apparatus, thereby reducing the likelihood that the external device is affected by a disaster in the event that the disaster occurs in a site where the image forming apparatus is installed, and
   the data base is configured to be restored from the external device after occurrence of the disaster.

* * * * *